(12) United States Patent
Sun et al.

(10) Patent No.: US 10,826,735 B2
(45) Date of Patent: *Nov. 3, 2020

(54) SYSTEMS AND METHODS FOR IMPLEMENTING AN OFDMA LTF DESIGN FOR WIRELESS NETWORK COMMUNICATION

(71) Applicant: NXP USA, Inc., Austin, TX (US)

(72) Inventors: Yakun Sun, San Jose, CA (US); Hongyuan Zhang, Fremont, CA (US); Rui Cao, Fremont, CA (US)

(73) Assignee: NXP USA, INC., Austin, TX (US)

( * ) Notice: Subject to any disclaimer, the term of this patent is extended or adjusted under 35 U.S.C. 154(b) by 65 days.

This patent is subject to a terminal disclaimer.

(21) Appl. No.: 16/291,649

(22) Filed: Mar. 4, 2019

(65) Prior Publication Data

US 2019/0199566 A1 Jun. 27, 2019

Related U.S. Application Data

(63) Continuation of application No. 15/174,263, filed on Jun. 6, 2016, now Pat. No. 10,230,556.

(Continued)

(51) Int. Cl.
*H04L 27/26* (2006.01)

(52) U.S. Cl.
CPC ...... *H04L 27/2602* (2013.01); *H04L 27/2613* (2013.01)

(58) Field of Classification Search
CPC .......................... H04L 27/2602; H04L 27/2613
See application file for complete search history.

(56) References Cited

U.S. PATENT DOCUMENTS

| 7,751,495 B1 | 7/2010 | Palanivelu |
| 2005/0111528 A1 | 5/2005 | Fulghum |

(Continued)

FOREIGN PATENT DOCUMENTS

| WO | WO-2014/123357 A1 | 8/2014 |
| WO | WO-2015/191901 A1 | 12/2015 |
| WO | WO-2016/080785 A1 | 5/2016 |

OTHER PUBLICATIONS

Zhang, H., HE-LFT Proposal; IEEE 802.11-15/0349, Mar. 9, 2015; pp. 1-43.

(Continued)

*Primary Examiner* — Walter J Divito

(57) ABSTRACT

Systems, methods, and apparatuses are disclosed herein for aligning HE-LTFs corresponding to a plurality of users by determining a respective number of spatial streams corresponding to each user, determining a highest respective number of spatial streams of the spatial streams, and setting an alignment number of HE-LTF symbols to be equal to or larger than the highest respective number of spatial streams. For each respective user, a respective matrix of HE-LTF symbols corresponding to the respective number of spatial streams of the respective user is selected, and it is determined whether the respective matrix of HE-LTF symbols has fewer symbols than the alignment number. In response to determining that the respective matrix of HE-LTF symbols has fewer symbols than the alignment number, padding symbols may be added to the respective matrix to yield a number of HE-LTF symbols in the respective matrix that corresponds to the alignment number.

20 Claims, 6 Drawing Sheets

Related U.S. Application Data

(60) Provisional application No. 62/184,362, filed on Jun. 25, 2015.

(56) References Cited

U.S. PATENT DOCUMENTS

| | | |
|---|---|---|
| 2006/0090208 A1 | 4/2006 | Smith |
| 2006/0182017 A1 | 8/2006 | Hansen |
| 2011/0013532 A1 | 1/2011 | Wu et al. |
| 2011/0134899 A1 | 6/2011 | Jones |
| 2015/0365972 A1 | 12/2015 | Seok |
| 2016/0360507 A1 | 12/2016 | Cariou |
| 2017/0373808 A1 | 12/2017 | Park |

OTHER PUBLICATIONS

International Preliminary Report on Patentability for International Application No. PCT/US2016/036382 dated Dec. 26, 2017.

International Search Report and Written Opinion dated Oct. 7, 2016 for PCT/US2016/036382, filed Jun. 8, 2016.

IEEE Standard 802.11ac 2013, Part II: Wireless LAN Medium Access Control (MAC) and Physical Layer (PHY) Specifications, Amendment 4: Enhancements for Very High Throughput for Operation in Bands below 6 GHz (425 pages).

IEEE Standard 802.11n. 2009, Part 11: Wireless LAN Medium Access Control (MAC) and Physical Layer (PHY) Specifications, Amendment 5: Enhancements for higher Throughput (536 pages).

SYSTEMS AND METHODS FOR IMPLEMENTING AN OFDMA LTF DESIGN FOR WIRELESS NETWORK COMMUNICATION

CROSS-REFERENCE TO RELATED APPLICATIONS

This patent application is a continuation of U.S. patent application Ser. No. 15/174,263 (now allowed), which claims the benefit of U.S. Provisional Patent Application No. 62/184,362, filed Jun. 25, 2015, the disclosures of which are hereby incorporated by reference herein in their entireties.

BACKGROUND

The background description provided herein is for the purpose of generally presenting the context of the disclosure. Work of the inventors hereof, to the extent the work is described in the background section, as well as aspects of the description that may not otherwise qualify as prior art at the time of filing, are neither expressly or impliedly admitted as prior art against the present disclosure.

The Institute of Electrical and Electronics Engineers (IEEE) 802.11n and 802.11ac standards describe applying an orthogonal spatial mapping matrix to High Throughput (HT) and Very High Throughput (VHT) Long Training Field (LTF) sequences in order to generate LTF symbols. The number of LTF symbols in a given Orthogonal Frequency Division Multiple Access (OFDMA) symbol is dependent on the number of spatial streams required for each scheduled user. Including OFDMA symbols for users who require a different number of spatial streams is not addressed by the 802.11n and 802.11ac standards.

SUMMARY

Systems, methods, and apparatuses are disclosed herein for aligning high efficiency long training fields ("HE-LTF") for data corresponding to a plurality of users. To this end, in some aspects of the disclosure, control circuitry may determine a respective number of spatial streams corresponding to each user of a plurality of users, and may determine a highest respective number of spatial streams of the spatial streams corresponding to the plurality of users. Control circuitry may then set an alignment number of HE-LTF symbols to be equal to or larger than the highest respective number of spatial streams.

For each respective user, the control circuitry may select a respective matrix of HE-LTF symbols corresponding to the respective number of spatial streams of the respective user. Control circuitry may then determine whether the respective matrix of HE-LTF symbols has fewer symbols than the alignment number, and, in response to determining that the respective matrix of HE-LTF symbols has fewer symbols than the alignment number, the control circuitry may add padding symbols to the respective matrix to yield a number of HE-LTF symbols in the respective matrix that corresponds to the alignment number.

The padding symbols may be randomly generated signals, or may be generated based on an algorithm. Adding the padding symbols to the respective matrix to yield a number of HE-LTF symbols in the respective matrix that corresponds to the alignment number may be performed by control circuitry first subtracting a respective amount of HE-LTF symbols for the respective matrix from the alignment number to yield a delta. The control circuitry may then generate the padding symbols by repeating a number of the HE-LTF symbols of the respective matrix that equals the delta to yield a set of repeated symbols, and may assign the repeated symbols to be the padding symbols. When repeating the number of the HE-LTF symbols of the respective matrix, the control circuitry may repeat a leading portion of the HE-LTF symbols of the respective matrix, such as a portion of the HE-LTF symbols of the respective matrix that has an amount of HE-LTF symbols equal to the delta, and that begins at the beginning of the matrix.

Alternatively, when adding the padding symbols to the respective matrix to yield a number of HE-LTF symbols in the respective matrix that corresponds to the alignment number, the control circuitry may generate the padding symbols by repeating the HE-LTF symbols of the respective matrix until the number of HE-LTF symbols of the respective matrix matches the alignment number.

The control circuitry may code at least one of an uplink orthogonal frequency division multiple access ("OFDMA") signal and a downlink OFDMA signal using the above-mentioned HE-LTF symbols. In this scenario, the control circuitry may ensure that the padding symbols align, with respect to time, the uplink OFDMA signal or the downlink OFDMA signal for each user.

In some aspects of the disclosure, control circuitry may align HE-LTF data corresponding to a plurality of users by first determining a respective number of spatial streams corresponding to each user of a plurality of users, and then may access, from memory, a template matrix of a predetermined size that is based on a highest number of spatial streams of the respective numbers of spatial streams corresponding to each user of the plurality of users. Control circuitry may use this information to generate a respective matrix of HE-LTF symbols for each user of the plurality of users based on the template matrix, where each respective matrix comprises a predefined number of columns that corresponds to the predetermined size, and where each respective matrix comprises a predefined number of rows equivalent to the respective number of spatial streams.

When the control circuitry is generating the respective matrix of HE-LTF symbols for each user of the plurality of users, the control circuitry may generate the respective matrix with the predefined number of columns and with the predefined number of rows, populate the rows of the respective matrix with HE-LTF symbols corresponding to spatial streams corresponding to the respective user, and delete unpopulated rows of the respective matrix.

In some embodiments, the predefined number of columns exceeds 8. In such a scenario, control circuitry may generate the respective matrix of HE-LTF symbols for each user of the plurality of users by generating a predefined 8×8 matrix, and then may circularly repeat the predefined 8×8 matrix throughout the predefined number of columns in order to fill the symbols of each column.

In some embodiments, each respective row of a given respective matrix is orthogonal to each other respective row of the given respective matrix. In these scenarios, the control circuitry may eliminate noise when de-spreading each row of each respective matrix by canceling each other row of the respective matrix.

Similar to the first aspect of the disclosure, the control circuitry may code at least one of an uplink orthogonal frequency division multiple access ("OFDMA") signal and a downlink OFDMA signal using the HE-LTF symbols, where each matrix is comprised of the predefined number of columns causes the uplink OFDMA signal or the downlink OFDMA signal of each user to be aligned in time.

DETAILED DESCRIPTION

Systems, apparatuses, and methods are described herein for aligning LTF symbols of users who have different numbers of corresponding spatial time streams in their communications, to arrive at an HE-LTF sequence. For example, orthogonal spatial mapping matrices may be applied to HT/VHT-LTF sequences to generate the LTF symbols. Applying orthogonal spatial mapping matrices to HT/VHT-LTF sequences to generate LTF symbols is described in the IEEE 802.11n and 802.11ac protocols, copyrighted in 2009 and 2013, respectively, the contents of which are each hereby incorporated by reference herein in their entireties. These HT/VHT-LTF symbols may not be aligned, however, if the users have different numbers of corresponding spatial time streams, which causes throughput and efficiency problems that HE-LTF symbols will solve. As used herein, HE-LTF symbols are LTF symbols of LTF sequences that are aligned by the systems and methods described herein.

The above-described technique for generating LTF symbols may apply no matter whether Single User-("SU") or Multiple User-("MU") Multiple Input, Multiple Output ("MIMO") techniques are used. For example, for a SU-MIMO transmission with N Spatial Time Streams ("$N_{STS}$"), $N_{HTLTF}$ symbols are sent, and each tone of the HTLTF symbols may be described by the following equation: $[r_{1,k} r_{2,k} \ldots r_{N_{HTLTF},k}]=Q_k \cdot P \cdot HTLTF_k$, where $r_{m,k}$ is the transmitted HE-LTF signal for the $m^{th}$ OFDM symbol on the $k^{th}$ tone, $Q_k$ is a beamforming matrix on the $k^{th}$ tone, and P is an $N_{STS} \times N_{HTLTF}$ spatial mapping matrix. By concatenating the received signals in time as in this equation, the effective channel on this tone can be solved. Essentially, a receiver is able to despread the received $N_{HTLTF}$ HTLTF symbols for channel estimation based on the following equations: $y=H [r_{1,k} r_{2,k} \ldots r_{N_{HTLTF},k}]$; $\hat{H}_{eff}=y \cdot P^-=H \cdot Q$, where y is the received HELTF signal (row) vector for the $k^{th}$ tone across all OFDM symbols, H is the physical channel frequency response on the same tone, and $H_{eff}=H \cdot Q$ is the effective (i.e. beamformed) channels where the data will be transmitted through, for which an estimate $\hat{H}_{eff}$ is obtained by removing the P matrix. The removal of P matrix is done as a despreading because P is an orthogonal matrix.

The systems, apparatuses, and methods disclosed herein apply OFDMA to LTF symbol generation in order to align the LTF symbols, which in turn improves network throughput and capacity, in, e.g., WLAN networks. To this end, each user or a group of users may be scheduled on a group of tones. Where the scheduled users do not have the same number of spatial streams, HE-LTF techniques are used to align the communications across all users.

Figure 1:
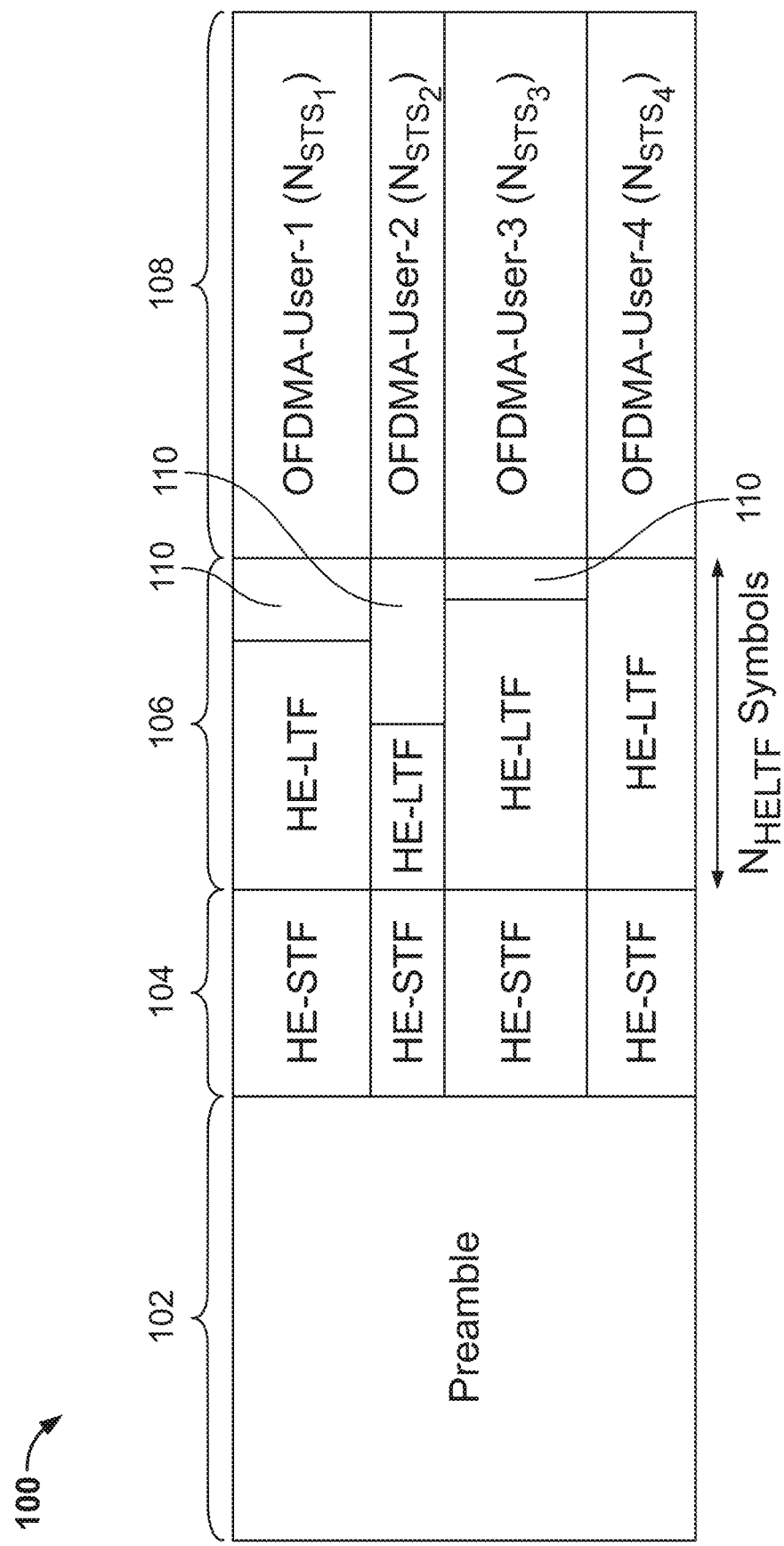
FIG. 1 depicts an OFDMA packet with aligned High Efficiency ("HE")-LTF fields that are aligned using random or insignificant padding bits, in accordance with some embodiments of the disclosure.

FIG. 1 depicts an OFDMA packet with aligned HE-LTF fields that are aligned using random or insignificant padding bits, in accordance with some embodiments of the disclosure. OFDMA packet 100 includes preamble 102, HE-Short Training Fields (STFs) 104, HE-LTFs 106, payloads 108, and padding 110. Control circuitry (e.g., of an access point) may determine the number of HE-LTF symbols in HE-LTFs 106 based on a user corresponding to a maximum number of spatial time streams. The control circuitry may use each user's $N_{STS}$ to determine a given user's P matrix (i.e., the $N_{STS} \times N_{HTLTF}$ spatial mapping matrix as defined above). Where a user's communication corresponds to fewer LTF symbols than $N_{HTLTF}$, padding symbols may be used to fill the remainder of the user's P matrix in order to align the HE-LTF matrices, as is shown in FIG. 1. In some embodiments, such as the embodiment of FIG. 1, the padding symbols may be randomly-generated or otherwise insignificant symbols that are merely used to achieve an appropriately-sized matrix. Other forms of the padding symbols are described below with respect to FIG. 2.

Figure 2:
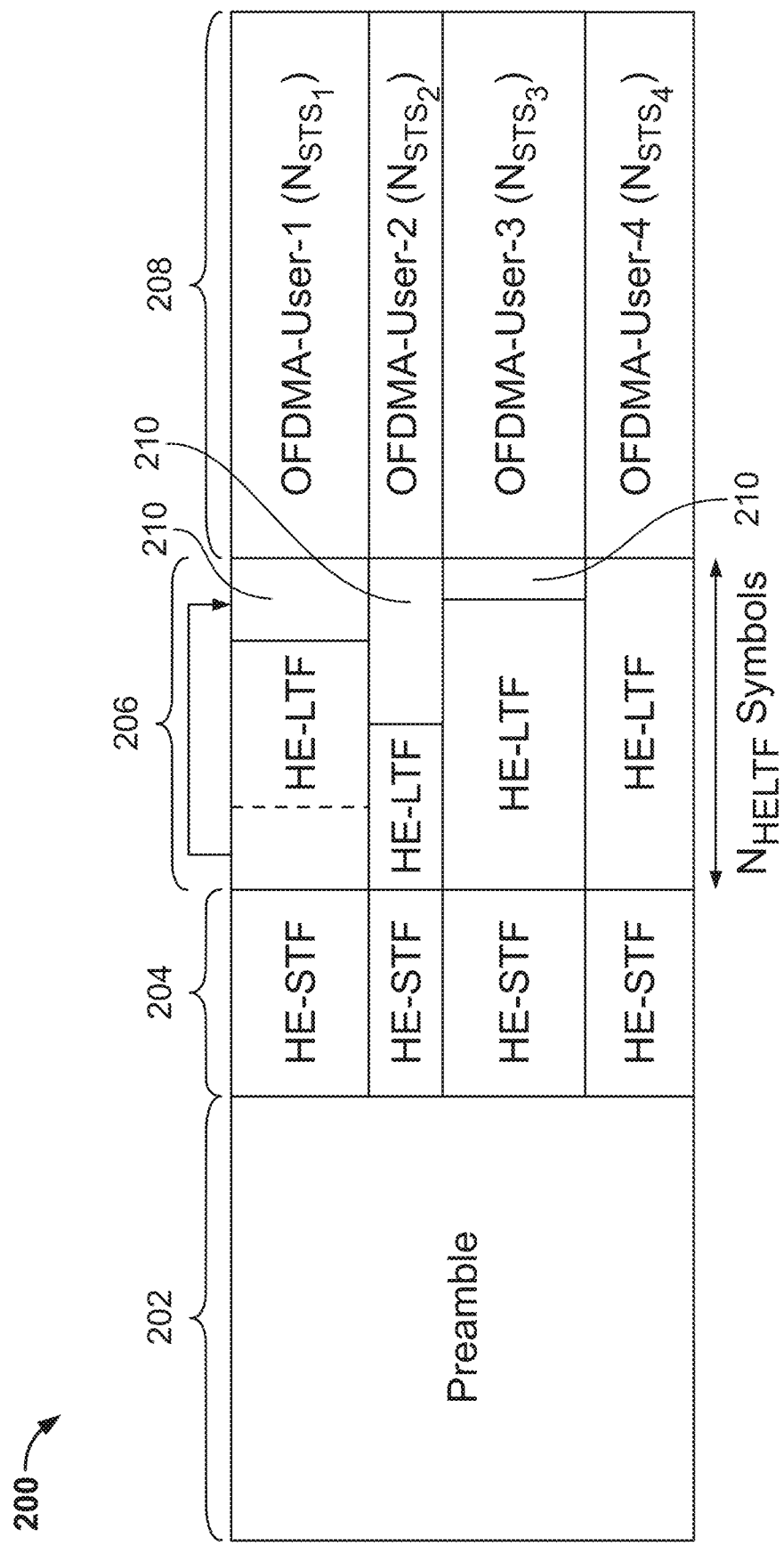
FIG. 2 depicts an OFDMA packet with aligned HE-LTF fields that are aligned using padding bits formed by circularly repeating HE-LTF symbols, in accordance with some embodiments of the disclosure.

FIG. 2 depicts an OFDMA packet with aligned HE-LTF fields that are aligned using padding bits formed by circularly repeating HE-LTF symbols, in accordance with some embodiments of the disclosure. Preamble 202, HE-STFs 204, HE-LTFs 206, and payloads 208 are formed using the same functionality for forming their counterpart components in FIG. 1. Padding symbols 210, however, are populated differently than padding symbols 110, which are, e.g., randomly generated. In this case, the padding symbols 210 are populated by circularly repeating the leading HE-LTF symbols 212 until $N_{HTLTF}$ symbols are achieved.

The meaning of circularly repeating the leading HE-LTF symbols 212 is as follows. If the spatial mapping matrix selected for the k-th tone is $P_k$, the first $N_{HTLTF}$ to $N_{VHTLTF}$ columns of $P_k$ are repeated to fill up the HE-LTF symbols of the matrix, where, if $N_{HTLTF} > 2N_{VHTLF}$, the first $N_{HTLTF}$ to $N_{VHTLTF}$ columns are continually repeated until all HE-LTF symbols are filled. This may be described by the following equation: $[r_{1,2} r_{2,k} \ldots r_{N_{HELTF},k}]=Q_k \cdot [P_k P_{k,1:N_{HELTF}-N_{VHTLTF}}] \cdot HTLTF_k$, where $Q_k$ is a beamforming matrix on the $K^{th}$ tone, and $P_k$ is an $N_{STS} \times N_{VHTLTF}$ spatial mapping matrix. Note that, in the case this is used in a MU-MIMO system, the $P_k$ matrix is the composite matrix over all users.

Figure 3:
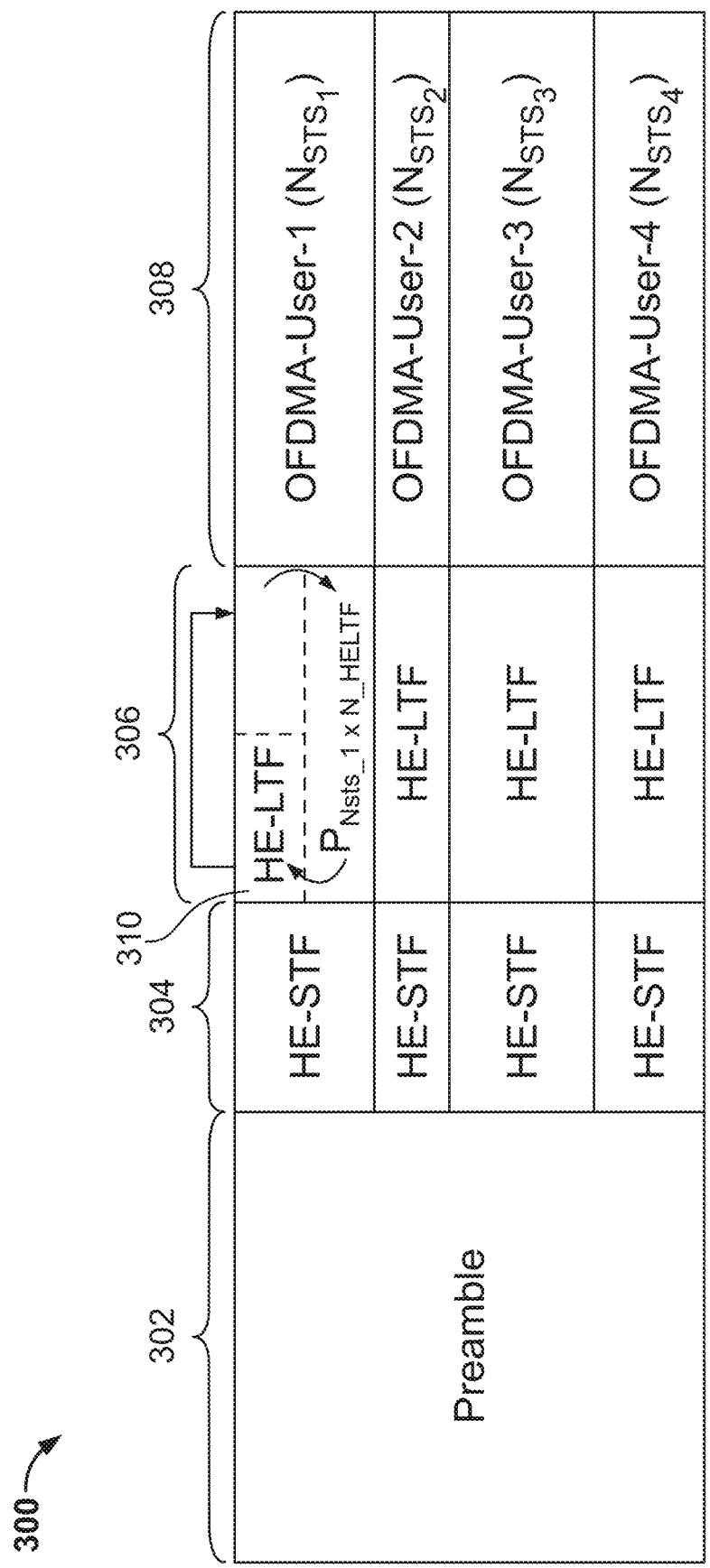
FIG. 3 depicts an OFDMA packet with aligned HE-LTF fields that are aligned by using a standard-sized HE-LTF matrix for each individual user, in accordance with some embodiments of the disclosure.

FIG. 3 depicts an OFDMA packet with aligned HT-LTF fields that are aligned by using a standard-sized HE-LTF matrix for each individual user, in accordance with some embodiments of the disclosure. Each individual user uses a sub-matrix of the standard-sized HE-LTF matrix, where the sub-matrices comprise contains the first few rows of the standard-sized HE-LTF matrix, and all columns of the standard-sized HE-LTF matrix. This method inherently aligns the HE-LTF among users. Preamble 302, HE-STFs 304, and payloads 308 have the same functionality as their counterparts of FIG. 1. HE-LTF matrices 306 all start with a predetermined $N_{HTLTF}$ number of columns, and are a size of $N_{STS} \times N_{HELTF}$.

Many standards presently support compatibility with $N_{HELTF}$ being equal or less than 8. However, the disclosure contemplates HE-LTF matrices 306 having an $N_{HELTF}$ number of columns that exceeds 8. In order to achieve this, should the predetermined number of $N_{HELTF}$ columns exceed 8, the columns of the top left $P_{8\times8}$ matrix 310 may be circularly repeated, as is depicted in FIG. 3. To avoid this process of circular repetition, new template $N_{HELTF} \times N_{HELTF}$ matrices where $N_{HELTF}$ exceeds 8 may be designed to fill HE-LTF matrices 306.

HE-LTF matrices 306 may be expressed as follows: $[r_{1,k} \ r_{2,k} \ \ldots \ r_{N_{HELTF},k}] = Q_k \cdot HELTF_k$, where $Q_k$ is a beamforming matrix on the $K^{th}$ tone, where $P_k$ is an $N_{STS} \times N_{HELTF}$ spatial mapping matrix of $P_k = \tilde{P}_{1:N_{STS}, 1:N_{HELTF}}$, and where $\tilde{P}$ is a standard-sized $N_{HELTF} \times N_{HELTF}$ orthogonal spatial mapping matrix template. By using the systems and methods relating to FIG. 3 of this disclosure, noise is minimized because each row is orthogonal to other rows. This enables cancelation of other rows when dispreading, which eliminates noise from those rows.

Note that the HE-LTF generation method applies for both UL and DL OFDMA. Moreover, if a user-specific HE-LTF sequence is used, the P matrix generation remains the same, where a same uniform template is used, as is demonstrated by the following equation: $[r_{1,k} \ r_{2,k} \ \ldots \ r_{N_{HELTF},k}] = Q_k \cdot A \cdot P_k$, where $$A = \begin{bmatrix} HELTF_k^{(1)} I_{N_{STS,1}} & & \\ & \ddots & \\ & & HELTF_k^{(u_{max})} I_{N_{STS,u_{max}}} \end{bmatrix},$$

and where $HELTF^{(u)}$ is the $u^{th}$ STA's HE-LTF sequences.

Figure 4:
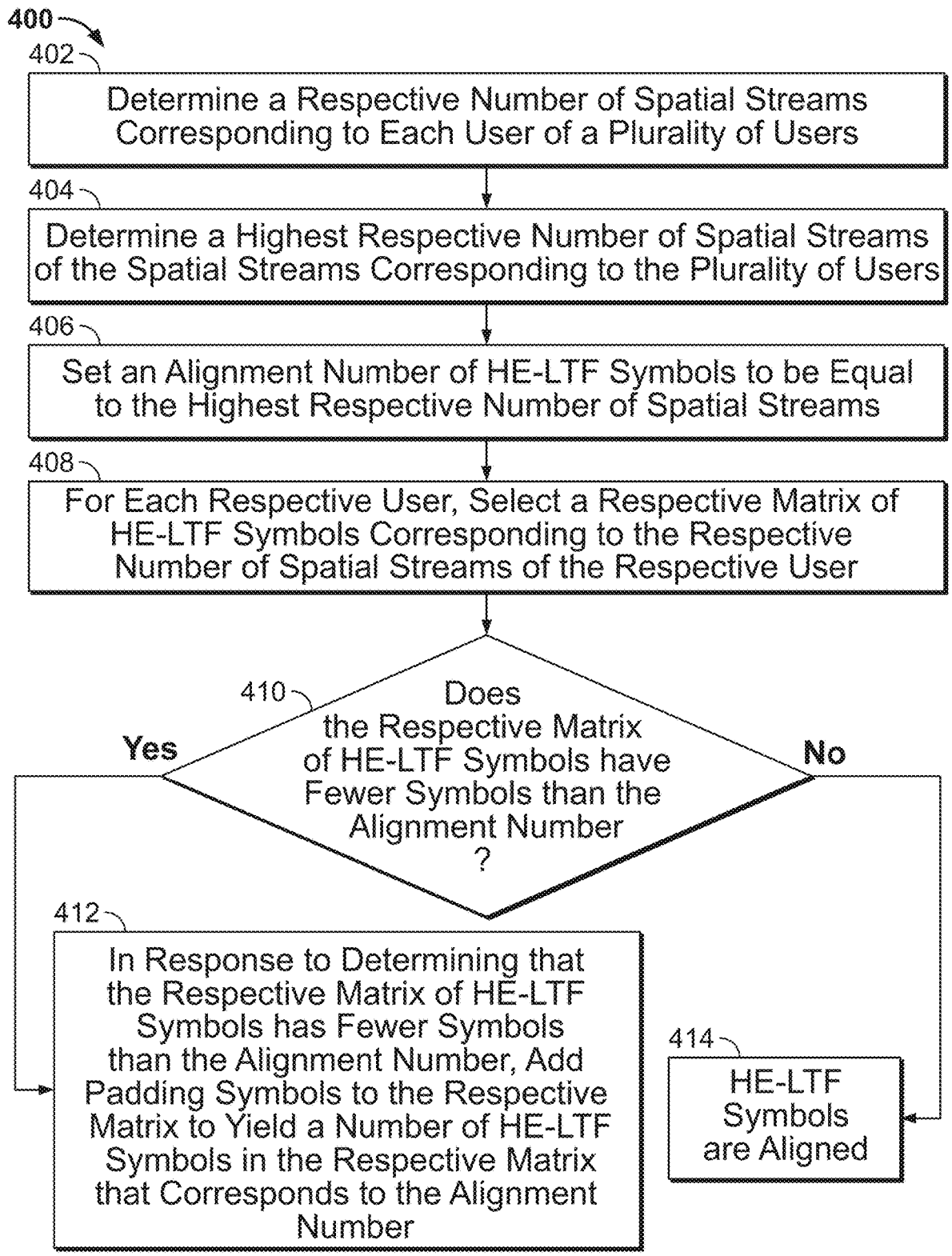
FIG. 4 is an illustrative flowchart that depicts a process for aligning HE-LTF symbols by using padding symbols, in accordance with some embodiments of the disclosure.

FIG. 4 is an illustrative flowchart that depicts a process for aligning HE-LTF symbols by using padding symbols, in accordance with some embodiments of the disclosure. Process 400 begins at 402, where control circuitry (e.g., of a wireless access point) may determine a respective number of spatial streams corresponding to each user of a plurality of users. At 404, the control circuitry may determine a highest respective number of spatial streams of the spatial streams corresponding to the plurality of users. For example, if there are four users, and the four users respectively correspond to two, four, four, and eight spatial streams, then the control circuitry will determine the highest number of spatial streams to be eight.

At 406, the control circuitry may set an alignment number of HE-LTF symbols to be equal to the highest respective number of spatial streams. Following from the example above, the alignment number will be eight. At 408, for each respective user, the control circuitry may select a respective matrix of HE-LTF symbols corresponding to the respective number of spatial streams of the respective user. For example, for a user who corresponds to four spatial streams, the control circuitry may select a four by four matrix.

At 410, the control circuitry may determine whether the respective matrix of HE-LTF symbols has fewer symbols than the alignment number (e.g., less than 8 symbols, following from the example above). If the respective matrix of HE-LTF symbols does have fewer symbols than the alignment number, process 400 may proceed to 412. If the respective matrix of HE-LTF symbols does not have fewer symbols than the alignment number, process 400 may proceed to 414.

At 412, the control circuitry may, in response to determining that the respective matrix of HE-LTF symbols has fewer symbols than the alignment number, add padding symbols to the respective matrix to yield a number of HE-LTF symbols in the respective matrix that corresponds to the alignment number. The content of the padding symbols is described in further detail above. At 414, the control circuitry may determine that the HE-LTF symbols are aligned.

Figure 5:
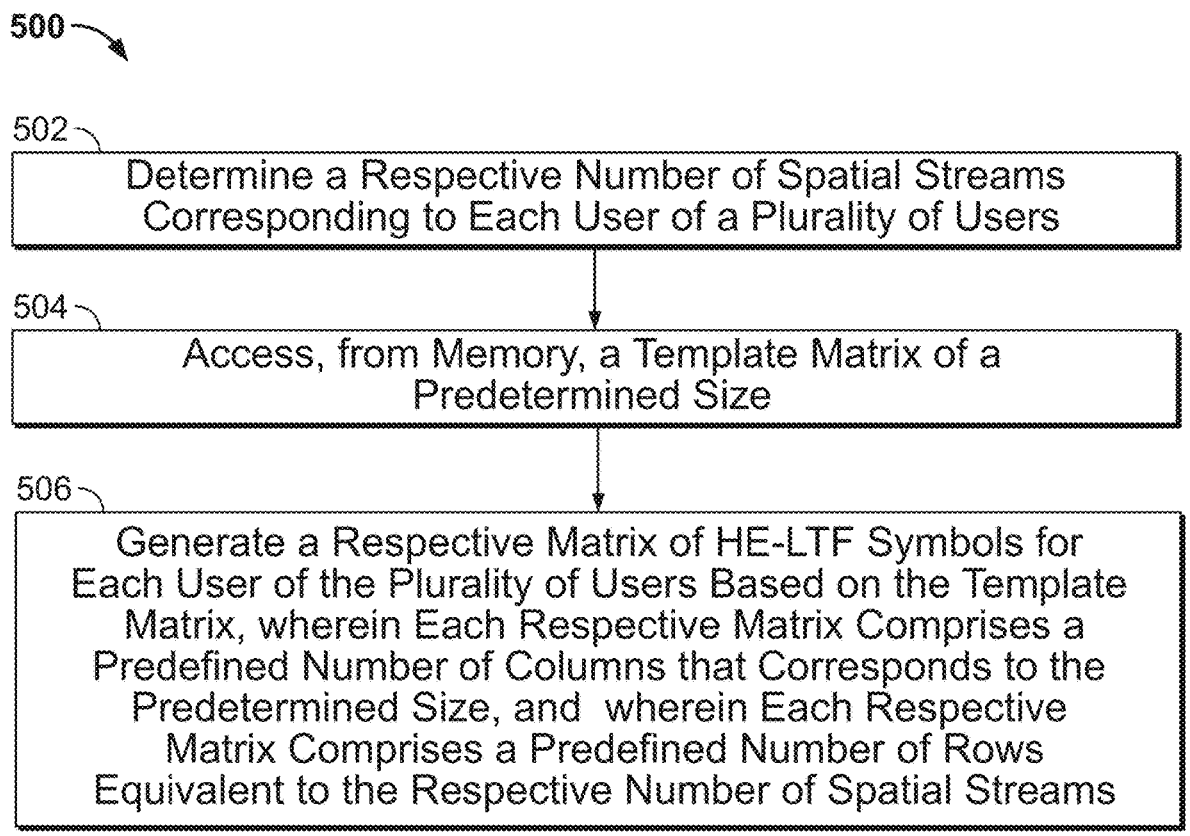
FIG. 5 is an illustrative flowchart that depicts a process for aligning HE-LTF symbols by using predefined matrices, in accordance with some embodiments of the disclosure.

FIG. 5 is an illustrative flowchart that depicts a process for aligning HE-LTF symbols by using predefined matrices, in accordance with some embodiments of the disclosure. Process 500 begins at 502, where control circuitry (e.g., of an access point) may determine a respective number of spatial streams corresponding to each user of a plurality of users. As described above, if there are four users, the users may correspond to two, four, four, and eight spatial streams, respectively.

At 504, control circuitry may generate a respective matrix of HE-LTF symbols for each user of the plurality of users, where each respective matrix comprises a predefined number of columns, wherein each respective matrix comprises a predefined number of rows equivalent to the respective number of spatial streams. Thus, each user is assigned a matrix of a same predetermined size to populate an HE-LTF sequence, thus ensuring alignment of the HE-LTF fields.

The foregoing describes systems and methods for aligning HE-LTF data for multiple user communications. The above-described embodiments of the present disclosure are presented for the purposes of illustration and not of limitation. Furthermore, the present disclosure is not limited to a particular implementation. For example, one or more steps of the methods described above may be performed in a different order (or concurrently) and still achieve desirable results. In addition, the disclosure may be implemented in hardware, such as on an application-specific integrated circuit (ASIC) or on a field-programmable gate array (FPGA). The disclosure may also be implemented in software by, for example, encoding transitory or non-transitory instructions for performing the process discussed above in one or more transitory or non-transitory computer-readable media.

Figure 6:
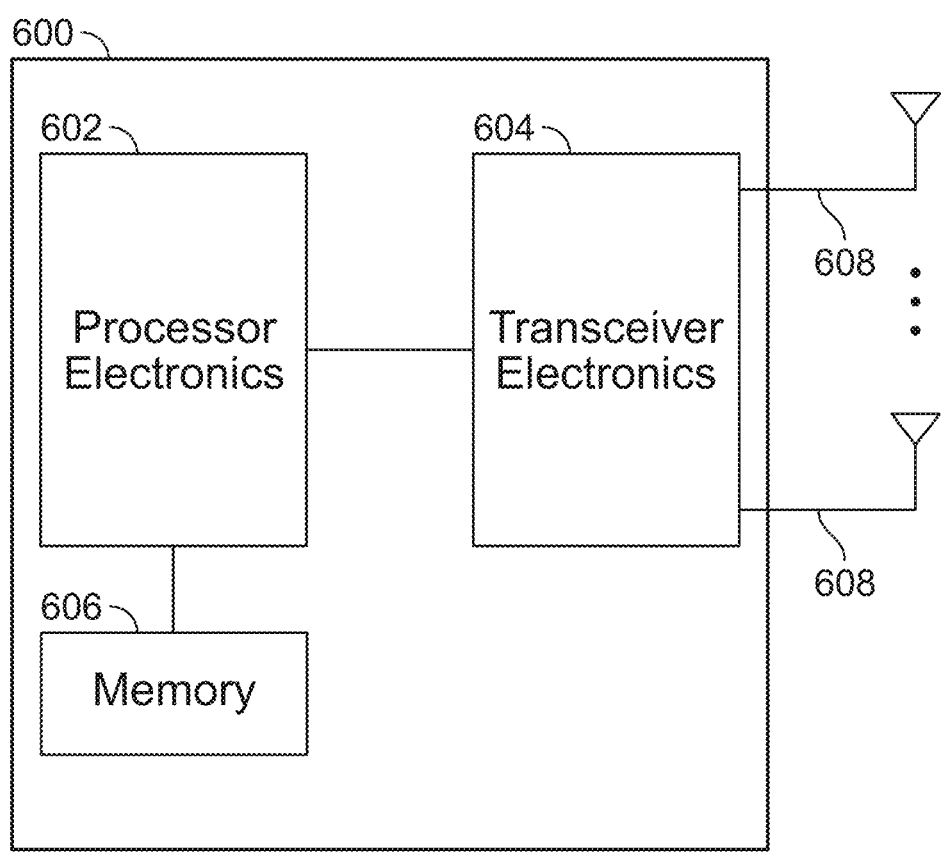
FIG. 6 is an illustrative system diagram including hardware that could be used to effect the systems and processes disclosed herein, in accordance with some embodiments of the disclosure.

FIG. 6 is an illustrative system diagram including hardware that could be used to effect the systems and processes disclosed herein, in accordance with some embodiments of the disclosure. FIG. 6 comprises device 600, which may be a router or any other device capable of providing communications consistent with the standards and protocols described in the foregoing. Processor electronics 602 of device 600 may comprise control circuitry that effects the processes described in the foregoing (e.g., process 400 and/or process 500). Transceiver electronics may operate transceivers 608, which may transmit, receive, despread, etc. the communications described above with respect to FIGS. 1-5. Memory 606 may be used to store instructions to effect the processes of FIGS. 4-5.

What is claimed is:

1. A method for aligning high efficiency long training fields ("HE-LTF") for data corresponding to a plurality of users, the method comprising:
   obtaining, at a wireless transmitter, data for transmission to a plurality of users via a plurality of wireless channels;
   determining a respective number of spatial streams for each user of the plurality of users for transmission via a data frame;
   determining a size of a template matrix, wherein a first number of columns of the template matrix corresponds to at least a maximum number of spatial streams among the plurality of users and a first number of rows of the template matrix corresponds to at least the maximum number of spatial streams among the plurality of users;

accessing, from memory, the template matrix of the determined size;

generating a respective spatial mapping matrix for each user of the plurality of users based on the template matrix, wherein each respective spatial mapping matrix comprises the first number of columns in the template matrix, and wherein each respective matrix comprises a second number of rows equal to the respective number of spatial streams;

generating, based on the respective spatial matrix for each of the plurality of users, the data frame comprising aligned HE-LTF symbols; and transmitting, via the wireless transmitter, the data frame via the plurality of wireless channels to the plurality of users.

2. The method for aligning HE-LTF for data corresponding to the plurality of users of claim 1, wherein determining the size of the template matrix comprises:

comparing the total number of spatial streams corresponding to the plurality of users to a plurality of predefined number of HE-LTF symbols; and determining a predefined number of HE-LTF symbols of the plurality of predefined number of HE-LTF symbols that is equal to or greater than the maximum number of spatial streams.

3. The method for aligning HE-LTF for data corresponding to the plurality of users of claim 2, wherein the plurality of predefined number of HE-LTF symbols comprises 1, 2, 4, 6, and 8.

4. The method for aligning HE-LTF for data corresponding to the plurality of users of claim 2, wherein determining the predefined number of HE-LTF symbols comprises determining a minimum predefined number of HE-LTF symbols among the plurality of predefined number of HE-LTF symbols that is equal to or greater than the maximum number of spatial streams.

5. The method for aligning HE-LTF for data corresponding to the plurality of users of claim 1, wherein generating the respective spatial mapping matrix for each user of the plurality of users based on the template matrix comprises:

generating the respective spatial mapping matrix with the number of columns in the template matrix and with the number of rows equal to the respective number of spatial streams; and populating the rows of the respective matrix with the corresponding row of the template matrix.

6. The method for aligning HE-LTF for data corresponding to the plurality of users of claim 1, wherein at least the maximum number of spatial streams among the plurality of users exceeds 8, and wherein generating a respective spatial mapping matrix for each user of the plurality of users based on the template matrix comprises:

accessing, from memory, a predefined 8×8 template matrix;

generating an extended spatial matrix, wherein the extended spatial matrix comprises:

a second number of columns that corresponds to at least the maximum number of spatial streams among the plurality of users that extends beyond 8; and a third number of rows is 8; and populating the extended spatial matrix based on the predefined 8×8 template matrix.

7. The method for aligning HE-LTF for data corresponding to the plurality of users of claim 6, wherein populating the extended spatial matrix based on the predefined 8×8 template matrix comprises:

determining a multiplier of 8 such that multiplying the multiplier by 8 is less than at least the maximum number of spatial streams among the plurality of users;

populating a partial number of the second number of columns by horizontally concatenating the predefined 8×8 matrix with itself a number of times equivalent to the multiplier to generate a partial extended spatial matrix; and populating a remaining number of the second number of columns by horizontally concatenating the partial extended spatial matrix with a portion of the predefined 8×8 matrix, wherein:

the portion of the predefined 8×8 matrix comprises a third number of columns corresponding to the remaining number and the third number of rows; and the partial number and the remaining number add up to the second number of columns.

8. The method for aligning HE-LTF for data corresponding to the plurality of users of claim 1, wherein each respective row of a given respective matrix is orthogonal to each other respective row of the given respective matrix.

9. The method for aligning HE-LTF for data corresponding to the plurality of users of claim 1, wherein generating, based on the respective spatial matrix for each of the plurality of users, the data frame comprising aligned HE-LTF symbols comprises calculating a dot product of a beamforming matrix and the respective spatial matrix.

10. The method for aligning HE-LTF for data corresponding to the plurality of users of claim 1, wherein generating, based on the respective spatial matrix for each of the plurality of users, the data frame comprising aligned HE-LTF symbols comprises:

defining an alignment number of HE-LTF symbols to be equal to or greater than the maximum number of spatial streams among the plurality of users; and determining the number of columns of the respective spatial matrix for each of the plurality of users is equivalent to the alignment number of HE-LTF symbols.

11. A system for aligning high efficiency long training fields ("HE-LTF") for data corresponding to a plurality of users, the system comprising:

a wireless transmitter configured to:

obtain, at a wireless transmitter, data for transmission to a plurality of users via a plurality of wireless channels;

control circuitry coupled to the wireless transmitter, configured to:

determine a respective number of spatial streams for each user of the plurality of users for transmission via a data frame;

determine a size of a template matrix, wherein a number of columns of the template matrix corresponds to at least a maximum number of spatial streams among the plurality of users and a first number of rows of the template matrix corresponds to at least the maximum number of spatial streams among the plurality of users;

access, from memory, the template matrix of the determined size;

generate a respective spatial mapping matrix for each user of the plurality of users based on the template matrix, wherein each respective spatial mapping matrix comprises the first number of columns in the template matrix, and wherein each respective matrix comprises a second number of rows equal to the respective number of spatial streams;

generate, based on the respective spatial matrix for each of the plurality of users, the data frame comprising aligned HE-LTF symbols; and the wireless transmitter further configured to:
transmit the data frame via the plurality of wireless channels to the plurality of users.

12. The system for aligning HE-LTF for data corresponding to the plurality of users of claim 11, wherein the control circuitry is further configured to determine the size of the template matrix by:

comparing the total number of spatial streams corresponding to the plurality of users to a plurality of predefined number of HE-LTF symbols; and determining a predefined number of HE-LTF symbols of the plurality of predefined number of HE-LTF symbols that is equal to or greater than the maximum of spatial streams.

13. The system for aligning HE-LTF for data corresponding to the plurality of users of claim 12, wherein the plurality of predefined number of HE-LTF symbols comprises 1, 2, 4, 6, and 8.

14. The system for aligning HE-LTF for data corresponding to the plurality of users of claim 12, wherein determining the predefined number of HE-LTF symbols comprises determining a minimum predefined number of HE-LTF symbols among the plurality of predefined number of HE-LTF symbols that is equal to or greater than the maximum number of spatial streams.

15. The system for aligning HE-LTF for data corresponding to the plurality of users of claim 11, wherein the control circuitry is further configured to generate the respective spatial mapping matrix for each user of the plurality of users based on the template matrix by:

generating the respective spatial mapping matrix with the number of columns in the template matrix and with the number of rows equal to the respective number of spatial streams; and populating the rows of the respective matrix with the corresponding row of the template matrix.

16. The system for aligning HE-LTF for data corresponding to the plurality of users of claim 11, wherein at least the maximum number of spatial streams among the plurality of users exceeds 8, and wherein the control circuitry is further configured to generate a respective spatial mapping matrix for each user of the plurality of users based on the template matrix by:

accessing, from memory, a predefined 8×8 template matrix;

generating an extended spatial matrix, wherein the extended spatial matrix comprises:

a second number of columns that corresponds to at least the maximum number of spatial streams among the plurality of users that extends beyond 8; and a third number of rows is 8; and populating the extended spatial matrix based on the predefined 8×8 template matrix.

17. The system for aligning HE-LTF for data corresponding to the plurality of users of claim 16, wherein the control circuitry is configured to populate the extended spatial matrix based on the predefined 8×8 template matrix by:

determining a multiplier of 8 such that multiplying the multiplier by 8 is less than at least the maximum number of spatial streams among the plurality of users;

populating a partial number of the second number of columns by horizontally concatenating the predefined 8×8 matrix with itself a number of times equivalent to the multiplier to generate a partial extended spatial matrix; and populating a remaining number of the second number of columns by horizontally concatenating the partial extended spatial matrix with portion of the predefined 8×8 matrix, wherein:

the portion of the predefined 8×8 matrix comprises a third number of columns corresponding to the remaining number and the third number of rows; and the partial number and the remaining number add up to the second number of columns.

18. The system for aligning HE-LTF for data corresponding to the plurality of users of claim 11, wherein each respective row of a given respective matrix is orthogonal to each other respective row of the given respective matrix.

19. The system for aligning HE-LTF for data corresponding to the plurality of users of claim 11, wherein the control circuitry is further configured to generate, based on the respective spatial matrix for each of the plurality of users, the data frame comprising aligned HE-LTF symbols by calculating a dot product of a beamforming matrix and the respective spatial matrix.

20. The system for aligning HE-LTF for data corresponding to the plurality of users of claim 11, wherein the control circuitry is further configured to generate, based on the respective spatial matrix for each of the plurality of users, the data frame comprising aligned HE-LTF symbols by:

defining an alignment number of HE-LTF symbols to be equal to or greater than the maximum number of spatial streams among the plurality of users; and determining the number of columns of the respective spatial matrix for each of the plurality of users is equivalent to the alignment number of HE-LTF symbols.

* * * * *